(12) United States Patent
Ofer et al.

(10) Patent No.: US 7,685,024 B2
(45) Date of Patent: Mar. 23, 2010

(54) SYSTEM AND METHOD FOR COMPUTERIZED ORDERING

(75) Inventors: Amir Ofer, Jerusalem (IL); Ofer Ber, Herzlia (IL)

(73) Assignee: Dolphin Software Ltd., Modiin (IL)

( * ) Notice: Subject to any disclaimer, the term of this patent is extended or adjusted under 35 U.S.C. 154(b) by 0 days.

(21) Appl. No.: 11/349,130

(22) Filed: Feb. 8, 2006

(65) Prior Publication Data

US 2006/0190348 A1 Aug. 24, 2006

Related U.S. Application Data

(60) Provisional application No. 60/719,963, filed on Sep. 26, 2005, provisional application No. 60/655,410, filed on Feb. 24, 2005.

(51) Int. Cl.
*G06F 17/30* (2006.01)

(52) U.S. Cl. .......................................... 705/27; 705/26

(58) Field of Classification Search .................. 705/26, 705/27

See application file for complete search history.

(56) References Cited

U.S. PATENT DOCUMENTS

| | | | |
|---|---|---|---|
| 5,319,542 A | 6/1994 | King, Jr. et al. | |
| 5,715,444 A | 2/1998 | Danish et al. | |
| 5,878,401 A | 3/1999 | Joseph | |
| 6,026,376 A | 2/2000 | Kenney | |
| 6,113,148 A * | 9/2000 | Koranda et al. | 283/81 |
| 6,125,352 A * | 9/2000 | Franklin et al. | 705/26 |
| 6,246,998 B1 | 6/2001 | Matsumori | |
| 6,381,583 B1 | 4/2002 | Kenney | |
| 6,606,603 B1 | 8/2003 | Joseph et al. | |
| 6,873,968 B2 | 3/2005 | Ehrlich et al. | |

(Continued)

FOREIGN PATENT DOCUMENTS

WO 00/43850 A2 7/2000

OTHER PUBLICATIONS

Microsoft Computer Dictionary, Fifth Edition. Definition of Shopping cart p. 478, Circa 2002.*

*Primary Examiner*—Mark Fadok
(74) *Attorney, Agent, or Firm*—The Nath Law Group; Derek Richmond; Sung Yeop Chung

(57) ABSTRACT

The present invention discloses a method and system for computerized ordering at least one product being a part of a final shopping list. The system comprises a first computerized trolley configured to facilitate a user to select at least one product among products being offered by one or more shops associated with the first trolley, thus giving rise to at least one first computerized order line corresponding to the selected product and being a part of a first shopping list; at least one second computerized trolley, each one of said second trolleys configured to automatically generate at least one second computerized order line matching to said first order line and comprising a product being offered by one or more shops associated with the second trolley, said second order line being a part of a second shopping list; wherein the final shopping list is configured to be based on said first shopping list or on said second shopping list. The method comprises providing said first computerized trolley, providing at least one said second computerized trolley, and facilitating compiling the final shopping list on the basis of said first shopping list or said second shopping list.

39 Claims, 12 Drawing Sheets

U.S. PATENT DOCUMENTS

| | | | |
|---|---|---|---|
| 7,120,595 B2 * | 10/2006 | Alexander | 705/26 |
| 7,127,414 B1 * | 10/2006 | Awadallah et al. | 705/26 |
| 7,249,065 B2 * | 7/2007 | Bliakhman et al. | 705/26 |
| 7,249,708 B2 * | 7/2007 | McConnell et al. | 235/383 |
| 7,376,613 B1 * | 5/2008 | Cofino et al. | 705/37 |
| 7,437,312 B2 * | 10/2008 | Bhatia et al. | 705/26 |
| 7,613,634 B2 * | 11/2009 | Siegel et al. | 705/26 |
| 2001/0047313 A1 | 11/2001 | Kanai | |
| 2002/0010637 A1 | 1/2002 | Lieu et al. | |
| 2002/0019782 A1 | 2/2002 | Hershtik | |
| 2002/0022995 A1 * | 2/2002 | Miller et al. | 705/14 |
| 2002/0046081 A1 | 4/2002 | Albazz et al. | |
| 2002/0072944 A1 | 6/2002 | Artinger | |
| 2002/0077937 A1 | 6/2002 | Lyons et al. | |
| 2002/0103712 A1 * | 8/2002 | Rollins et al. | 705/26 |
| 2002/0107747 A1 | 8/2002 | Gerogianni | |
| 2002/0133378 A1 * | 9/2002 | Mault et al. | 705/3 |
| 2002/0143667 A1 | 10/2002 | Ho | |
| 2002/0154162 A1 * | 10/2002 | Bhatia et al. | 345/745 |
| 2002/0161674 A1 | 10/2002 | Scheer | |
| 2002/0165803 A1 | 11/2002 | Iwase et al. | |
| 2002/0174021 A1 * | 11/2002 | Chu et al. | 705/26 |
| 2002/0178014 A1 | 11/2002 | Alexander | |
| 2002/0178088 A1 | 11/2002 | Lurie et al. | |
| 2002/0184109 A1 | 12/2002 | Hayet et al. | |
| 2002/0188528 A1 | 12/2002 | Adelman et al. | |
| 2003/0004831 A1 * | 1/2003 | Owens | 705/26 |
| 2003/0023499 A1 | 1/2003 | Das et al. | |
| 2003/0046188 A1 | 3/2003 | Orozco | |
| 2003/0177072 A1 | 9/2003 | Bared | |
| 2003/0233311 A1 | 12/2003 | Bramnick et al. | |
| 2003/0236710 A1 * | 12/2003 | Tong et al. | 705/26 |
| 2004/0002900 A1 | 1/2004 | Cohen et al. | |
| 2004/0015415 A1 * | 1/2004 | Cofino et al. | 705/26 |
| 2004/0019536 A1 | 1/2004 | Ashkenazi et al. | |
| 2004/0034571 A1 | 2/2004 | Wood et al. | |
| 2004/0039661 A1 | 2/2004 | Fuzell-Casey et al. | |
| 2004/0078294 A1 * | 4/2004 | Rollins et al. | 705/27 |
| 2004/0093274 A1 | 5/2004 | Vanska et al. | |
| 2004/0103034 A1 * | 5/2004 | Reade et al. | 705/16 |
| 2004/0117276 A1 | 6/2004 | Kettler, III | |
| 2004/0167833 A1 | 8/2004 | Schickler | |
| 2004/0249723 A1 | 12/2004 | Mayer | |
| 2005/0049938 A1 * | 3/2005 | Venkiteswaran | 705/27 |
| 2005/0060242 A1 | 3/2005 | Armstrong et al. | |
| 2005/0119948 A1 * | 6/2005 | Musgrove | 705/27 |
| 2006/0031123 A1 * | 2/2006 | Leggett et al. | 705/26 |
| 2006/0059062 A1 * | 3/2006 | Wood et al. | 705/35 |
| 2006/0106665 A1 * | 5/2006 | Kumar et al. | 705/10 |
| 2006/0157564 A1 | 7/2006 | Schulte | 235/383 |
| 2006/0190348 A1 * | 8/2006 | Ofer et al. | 705/26 |

* cited by examiner

Checkout: Compare Shops

Review comparable trolleys

Review checkout options below. Feel free to explore any of these options;
You will always be able to return to this page and to your original trolley by clicking the 'Compare Shops' link in the next pages.

| Online shops | Total Cost | Save More! | Substitutions | Review substitutions |
|---|---|---|---|---|
| ASDA | £89.73 | up-to £5 | 9 | Continue with ASDA >> |
| Sainsbury's | £92.14 | up-to £4 | 8 | Continue with Sainsbury's >> |
| TESCO | £95.78 | up-to £6 | 0 | Checkout from Tesco >> |
| Waitrose | £98.09 | up-to £3 | 7 | Continue with Waitrose >> |
| ocado | £99.01 | up-to £7 | 8 | Continue with Ocado >> |

Online shops - Comparable trolleys from online shops that deliver to your address. more
User Rating - Based on www.shopping.co.uk. more
Total Cost - Estimated cost of equivalent trolleys at different shops. more
Save More! - You can always save more by replacing products with better value selections. more
Substitutions - Items that are not supplied by the shop and therefore have to be replaced. more
Review Substitutions - Proceed to review and select available substitutions at the new shop. more Trolley: Tesco (44) £95.79

Checkout from Tesco >>

Figure 7

Retailer A (1101)

| Time | Mon | Tue | Wed | Thu | Fri | Sat | Sun |
|---|---|---|---|---|---|---|---|
| 8:30 | | | 3 | 5 | | | |
| 9:00 | | | 3 | 5 | | | |
| 9:30 | | | 3 | 5 | | | |
| 10:00 | | | 3 | 5 | | | |
| 10:30 | | | 3 | 5 | 6 | | |
| 11:00 | | | 3 | 5 | 6 | | |
| 11:30 | | 4 | 3 | 5 | 6 | 6 | |
| 12:00 | | | 3 | 5 | 6 | 6 | |
| 12:30 | | | 3 | 5 | 6 | 6 | |
| 13:00 | | | 3 | 5 | 6 | | |
| 13:30 | | 4 | 3 | 5 | | 6 | |
| 14:00 | | 4 | 3 | 5 | 6 | 6 | |
| 14:30 | | 4 | 3 | 5 | 6 | 6 | |
| 15:00 | | 4 | 3 | 5 | 6 | 6 | |
| 15:30 | | | 3 | 5 | 6 | 6 | |
| 16:00 | | 4 | 3 | 5 | 6 | 6 | |
| 16:30 | | 4 | 3 | 5 | 6 | | |
| 17:00 | | 4 | 3 | 5 | 6 | | |
| 17:30 | | 4 | 3 | 5 | | | |
| 18:00 | | 4 | 3 | 5 | 6 | | |
| 18:30 | | | | 5 | | | |
| 19:00 | | | | 5 | 6 | | |
| 19:30 | | | 3 | 5 | | | |
| 20:00 | | | | 5 | | | |
| 20:30 | | | | 5 | | | |
| 21:00 | 5 | 4 | | 5 | | | |
| 21:30 | 5 | 4 | 3 | 5 | | | |

Retailer B (1102)

| | Mon | Tue | Wed | Thu | Fri | Sat | Sun |
|---|---|---|---|---|---|---|---|
| 7-9 | | | 5 | 6 | | 6 | |
| 9-11 | | | 5 | 6 | 6 | 6 | 7 |
| 11-13 | | 5 | 5 | 6 | 6 | 6 | 7 |
| 13-15 | | | | 6 | 6 | 6 | 7 |
| 15-17 | | 5 | | 6 | 6 | 6 | 7 |
| 17-19 | | | 5 | 6 | 6 | 6 | 7 |
| 19-21 | 5 | 5 | 5 | 6 | 6 | 6 | 7 |
| 21-22 | | | | | 6 | | |

Figure 11a

Retailers A+B (1103)

| | Mon | Tue | Wed | Thu | Fri | Sat | Sun |
|---|---|---|---|---|---|---|---|
| 7-9 | | | 8 | 11 | | | |
| 9-11 | | 9 | 8 | 11 | | | |
| 11-13 | | | 8 | 11 | 12 | | |
| 13-15 | | 9 | | 11 | 12 | 12 | |
| 15-17 | | | 8 | 11 | 12 | 12 | |
| 17-19 | | | | 11 | 12 | 12 | |
| 19-21 | | | | 11 | | | |
| 21-22 | | | | 11 | | | |

Figure 11b

SYSTEM AND METHOD FOR COMPUTERIZED ORDERING

This application claims the benefit of prior U.S. provisional patent applications No. 60/655,410 filed Feb. 24, 2005 and 60/719,963 filed Sep. 26, 2005, the contents of which are hereby incorporated by reference in their entirety.

FIELD OF INVENTION

The invention relates to the field of computerized shopping and, more specifically, to systems and methods for computerized ordering of multiple items from multiple sources.

BACKGROUND OF THE INVENTION

With the proliferation of networked computer systems there has been a corresponding evolution of remote ordering, also called "computerized ordering". The remote ordering also includes remote identifying of suppliers and/or products to be ordered, and may be a base for different shopping modes, for example on-line shopping, physical shopping, on-line ordering and physical pickup, etc. However, the progress of remote ordering in some segments (e.g. Supermarket, Food and Grocery (SFG), semiconductor components, building materials, drug stores, etc.) is far slower than in other segments. Typically, computerized ordering in SFG and similar markets includes ordering multiple items from multiple vendors. This problem has been recognized in prior art and various systems have been developed to provide a solution, for example:

U.S. Pat. No. 5,319,542 (King) discloses a system facilitating a user in electronically ordering items from suppliers. The system is comprised of an Electronic Catalogue and an Electronic Requisition facility. The Electronic Catalogue includes a Public Catalog and a Private Catalogue. The Public Catalog is stored on a publicly available database for access by customers/requestors. The Private Catalogue is resident on a Customer's computer system and may contain unique pricing data based on pricing agreements. The Electronic Requisition facility is used by the customers/requestors to electronically create purchase requisitions based upon the information provided in the catalogues and route the requisitions through the appropriate approval process within the enterprise. Requisitions are then processed through the customer's procurement system and transmitted electronically as purchase orders to suppliers.

U.S. Pat. No. 5,715,444 (Danish et al.) discloses a process for identifying a single item from a family of items by presenting a user with a feature screen having a series of groupings. Each grouping represents a feature having a set of alternatives from which to select. Selected alternatives are used as selection criteria in a search operation. A result of the search operation is a revised feature screen indicating alternatives that remain available to the user for further selection and searching. The feature screen and search process, therefore, presents the user with a guided non-hierarchical parametric search to identify matching items based upon user-specified criteria and priorities. Also disclosed is an adaptation of the claimed method and system appropriate in an Internet environment.

U.S. Pat. No. 5,878,401 (Joseph) discloses an apparatus that displays alternative items for items that are out of stock in a store or the like. A request for an item is entered into a sales computer. The computer determines from a database whether the requested item is available. If the item is unavailable, the computer determines alternative items that are available for sale. These available alternative items are interactively displayed for the customer. The alternative items are determined from an alternative item database wherein each item is categorized with alternative items. A mass data storage device stores an image of each alternative item. A method of determining and displaying alternative items includes the steps of: inputting a request for an item; determining the availability of the requested item and alternative items for the requested item if it is unavailable; and interactively displaying the alternative items.

U.S. Pat. No. 6,606,603 (Alkin et al.) discloses a system for electronically ordering items having at least one supplier computer system for storing at least one catalog containing the items offered by a supplier and a customer computer system with the improvement of a public computer system comprising an index to the items in the catalogs on the at least one supplier computer system, means for querying the index on the public computer system for a desired item in response to a request for the desired item from the customer computer system and means for generating a pointer for the customer computer system to catalog information about the desired item in the catalog on the at least one supplier system which has been identified by the query of the index.

U.S. Pat. No. 6,873,968 (Ehrlich et al.) discloses a price comparison and adjustment system which can be used in the context of an Internet environment. The system comprises a server based browser, a shopping cart manager, an extraction and verification module, a validation module, and a counter offer module. The system provides an Internet shopper with a convenient method for comparison shopping online while allowing the shopper control over the comparison-shopping search, which also enables a host merchant to counter-offer prices at rival merchants' web sites. The system also provides information about rival merchants to the host merchant, which allows the host merchant to develop an optimal pricing and counter-offer strategy. The system creates a portable virtual shopping cart that allows the Internet user to browse rival merchants without the appearance of leaving the host merchant's web site, and further allows the shopper to quickly return to the host merchant's web site to purchase items in the virtual shopping cart.

US Patent Application 2002/178,014 (Alexander) discloses a method and system for providing online comparison shopping. The system provides online comparison shopping through a designated website accessible by a user via a communication network such as the Internet. The method includes the steps of compiling a shopping list identifying specific items to be purchased, receiving optimization criteria specified by the user, optimizing, by the system, the shopping list based on the optimization criteria to produce an optimal shopping order, and displaying the optimal shopping order to the user if the optimal shopping order exists.

US Patent Application 2003/4,831 (Owens) discloses a method and system for interactively shopping for groceries, especially on an Internet web site, where the user may create a shopping list, shop for items from the list at a selected grocery store, arrange for pick up or delivery of the selected items and payment, or to download the list to a PDA or for printing with the store's layout for use in the store. Shopping lists may be created from a single input screen using standard language text; and products may be automatically suggested to the user based on best regular price or retailer's specials. Recipes may be altered to meet numbers of servings or dietary requirements and changes stored for future use.

US Patent Application 2003/177,072 (Bared) discloses an Internet-based grocery ordering system and method for providing drive-through customer pick-up of grocery orders at multiple remote locations as selected by the customer. The system integrates front-end customer friendly drive-through markets with an online order management system and delivery of groceries from fulfillment centers to drive-through markets at locations designed by the ordering customer. The system includes consolidated purchasing, customized electronic ordering and cost effective logistics management software.

US patent Application 2004/19,536 (Ashkenazi et al.) discloses a system and method for facilitating online comparison shopping, including a similarity engine, a navigational system, and a step skipping system. The system and method according to the invention include a method for determining similarity between two preferably disparate products. The system and method also preferably include a method of increasing efficiency of navigation in a comparison shopping site based on product coverage and product entropy. The system and method further include a method of step-skipping to quicken user navigation through a comparison shopping site.

US Patent Application 2004/34,571 (Ferman et al.) discloses a network-based ordering system comprising one or more client devices connected to a server through a network, each client device operated by a user; one or more merchant devices connected to the server through a network, each merchant device associated with one or more merchants; a memory in which is stored a merchant product database, the database including a plurality of product data items representing products available from each merchant; a display configured to display to a user information identifying one or more product data items in the memory; a request processor configured to receive a user order from a user for one or more product data items; a dispatcher configured to receive the user order from the request processor, to transmit the user order to a delivery agent for delivery of the ordered goods to the user; and an inventory manager configured to receive a user order from the dispatcher and to update the merchant product database.

US Patent Application 2004/117,276 (Kettler) discloses an online list generation process including a product database having a product list that itemizes products offered for sale by a merchant. A user interface allows a potential customer to access the product database and retrieve at least a portion of the product list. A user selection process enables the potential customer to select one or more of the individual products itemized in the retrieved portion of the product list. A shopping list is generated that itemizes the individual products that the potential customer intends to pick up from the merchant's place of business.

US Application 2004/249,723 (Mayer) discloses a system for automatic optimization of orders of multiple items from multiple sources, which takes into account at least the item prices and the shipment prices, and generates at least one acceptable or near-optimal offer, comprising a) at least one server capable of searching multiple vendor sites for prices and other relevant data or capable of obtaining the results from one or more such servers; or a program running on the user's computer, capable of searching multiple vendors sites for prices and other relevant data or capable of obtaining the results from one or more said servers; b) a server capable of executing the computations needed for finding said at least one acceptable offer or a server capable of using at least partially the computation power of the user's own computer for executing said computations; or a program on the user's computer capable of executing said optimizations.

International Application WO004/3,850 discloses a searchable database comprising a multiplicity of tables including an attributes table and a values table for a multiplicity of target search items constructed and arranged so that selection of values for one or more target search item attributes, yields an attribute-value construct specifying a particular one of said target search items and precluding an indeterminate search result. Such a database may be employed in an online comparison shopping system comprising a database containing product information of multiple vendors, manufacturers and/or products and a user interface generating a virtual shopping cart, and constructed and arranged to enable a user to selectively aggregate an order in said virtual shopping cart, comprising products represented in said database, and means for electronically disaggregating said order to generate vendor-specific orders to respective vendors.

SUMMARY OF THE INVENTION

There are several reasons complicating the computerized ordering in the SFG and similar market segments, for example:

Hidden identities, similarities and differences between products, e.g. identical and/or almost-identical products may have different names or may be offered under different brands; also different products (e.g. similar products manufactured by different manufacturers) may have identical names.

Relatively large number of items-per-order, typically, with no dominant component.

Substituting alternatives when specific need may be supplied by multiple items (e.g. different packaging, different manufacturers, similar-but-not-identical items, etc) and/or be composed of several items (e.g. "Sugar, 2 Kg" may be supplied by 4×500 gr sugar bags, by 2×1 Kg sugar cans or by a 1×2 Kg sugar can), etc.

Multiple suppliers with partly-replaceable items. Some of the items are provided under retailers' private labels complicating comparison between items.

Dynamic shopper preferences and optimization criteria, etc.

SFG market has also specific difficulties related to delivery. For example, the shipment sometimes has to be stored immediately in the refrigerator; it cannot be redirected to alternative locations such as the office; delivery would typically require physical presence of the shopper when it arrives, etc. This results in problems in splitting an order between two (or more) suppliers and coordination of delivery time slots.

One more problem for computerized ordering multiple items from multiple suppliers is to carry out shopping sessions at different Internet sites. This problem results from several reasons, for example, A need to spend time on registration to a new site.

A need to spend time on becoming familiar with a different shopping interface.

A need to re-specify shopper's preferences (e.g. diabetic/kosher/low fat products, etc.)

An inability to re-use in a new site data related to shopper's experience (e.g. a content of last trolley, list of favorite products (i.e. products with high probability of being selected by the shopper, etc.)

Problems in getting comparison data between different sites, etc.

There is a need in the art to provide a system and method which substantially reduces or eliminates the drawbacks of hitherto known solutions and in some of its aspects oriented to requirements of SFG and similar markets.

According to certain aspects of the present invention there is provided a method for computerized ordering at least one product being a part of a final shopping list, the method comprising:

providing a first computerized trolley configured to facilitate a user to select at least one product among products offering by one or more shops associated with the first trolley (shopping cart), thus giving rise to at least one first computerized order line corresponding to the selected product and being a part of a first computerized shopping list;

providing at least one second computerized trolley, each one of said second trolleys configured to automatically generate at least one second computerized order line matching to said first order line and comprising a product offering by one or more shops associated with the second trolley, said second order line being a part of a second computerized shopping list;

facilitating compiling the final shopping list on the basis of said first shopping list or said second shopping list.

In accordance with other aspects of the present invention, there is provided a system for computerized ordering at least one product being a part of a final shopping list, the system comprising:

a first computerized trolley configured to facilitate a user to select at least one product among products being offered by one or more shops associated with the first trolley, thus giving rise to at least one first computerized order line corresponding to the selected product and being a part of a first shopping list; at least one second computerized trolley, each one of said second trolleys configured to automatically generate at least one second computerized order line matching to said first order line and comprising a product being offered by one or more shops associated with the second trolley, said second order line being a part of a second shopping list; wherein the final shopping list is configured to be based on said first shopping list or on said second shopping list.

In accordance with further aspects of the invention, at least one said second order line is generated concurrently with said first order line or in a predefined delay after said first order line or in accordance with a predefined event.

In accordance with further aspects, the present invention includes calculating and displaying total prices and/or differences in the total prices of the corresponding shopping lists in said first trolley and at least one said second trolley. Said calculating and/or displaying may be provided concurrently.

In accordance with further aspects of the present invention said one or more shops associated with at least one trolley may be selected by the user, predefined and/or selected by system.

In accordance with further aspects, the present invention further includes creating a unified catalogue comprising information related to products being offered by one or more shops associated with the first trolley and the second trolleys, wherein said products are grouped in accordance with certain criteria, and the first trolley is configured to facilitate the user to select one or more products on the basis of the unified catalogue. The unified catalogue may comprise information related to replacing or substituting products.

In accordance with further aspects, the present invention further includes generating, in accordance with the user's preferences, a personal catalogue as a derivation of the unified catalogue, and configuring the first trolley to facilitate the user to select one or more products on the basis of the personal catalogue. The personal catalogue may comprise information related to personalization of replacing and/or substituting products.

In accordance with further aspects of the present invention the products in the unified catalogue and/or personal catalogue may be grouped. The first trolley may be configured to facilitate the user to specify the selected product on a level of a product group. Specifying the selected product at a product group level gives rise to at least two corresponding first order lines comprising replacing products and configured to facilitate the user's selection of one of them or, alternatively, to a corresponding first order line comprising replacing product automatically selected in accordance with predefined rules.

In accordance with further aspects of the present invention, the first order line and the matching second order line comprise identical products or, alternatively, different products, wherein the product in said second order line being a substituting product of the product in said first order line.

In accordance with further aspects, if selected product has no available substituting product among the products being offered by one or more shops associated with the second trolley, the present invention further includes calculating the total price of the second shopping list using price information related to the product selected in the first order line.

In accordance with further aspects of the present invention, at least one second trolley is configured to automatically generate at least two second order lines matching to said first order line configured to facilitate the user's selection of one of them, wherein at least one of said second order lines comprises a product substituting the selected product.

In accordance with further aspects of the present invention, at least one of the shopping lists may be automatically optimized in accordance with predefined criteria. Said predefined criteria may be related to delivery characteristics. Said optimization may include splitting shopping list between at least two shops associated with the corresponding trolley.

In accordance with other aspects of the present invention, there is provided a computer program comprising computer program code means for performing all the steps of provided method when said program is run on a computer. This computer program may be embodied on a computer readable medium.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 illustrates a fragment of a sample screen comprising order input part specification in accordance with certain embodiments of the present invention.

FIG. 4 illustrates a fragment of a sample screen comprising a computerized shopping list in accordance with certain embodiments of the present invention.

FIG. 7 illustrates a fragment of a sample screen for selecting the preferred trolley in accordance with certain embodiments of the present invention.

FIGS. 11*a*-11*b* illustrate an exemplified delivery optimization in accordance with certain embodiments of the invention.

DETAILED DESCRIPTION OF EXEMPLARY EMBODIMENTS

Figure 1:
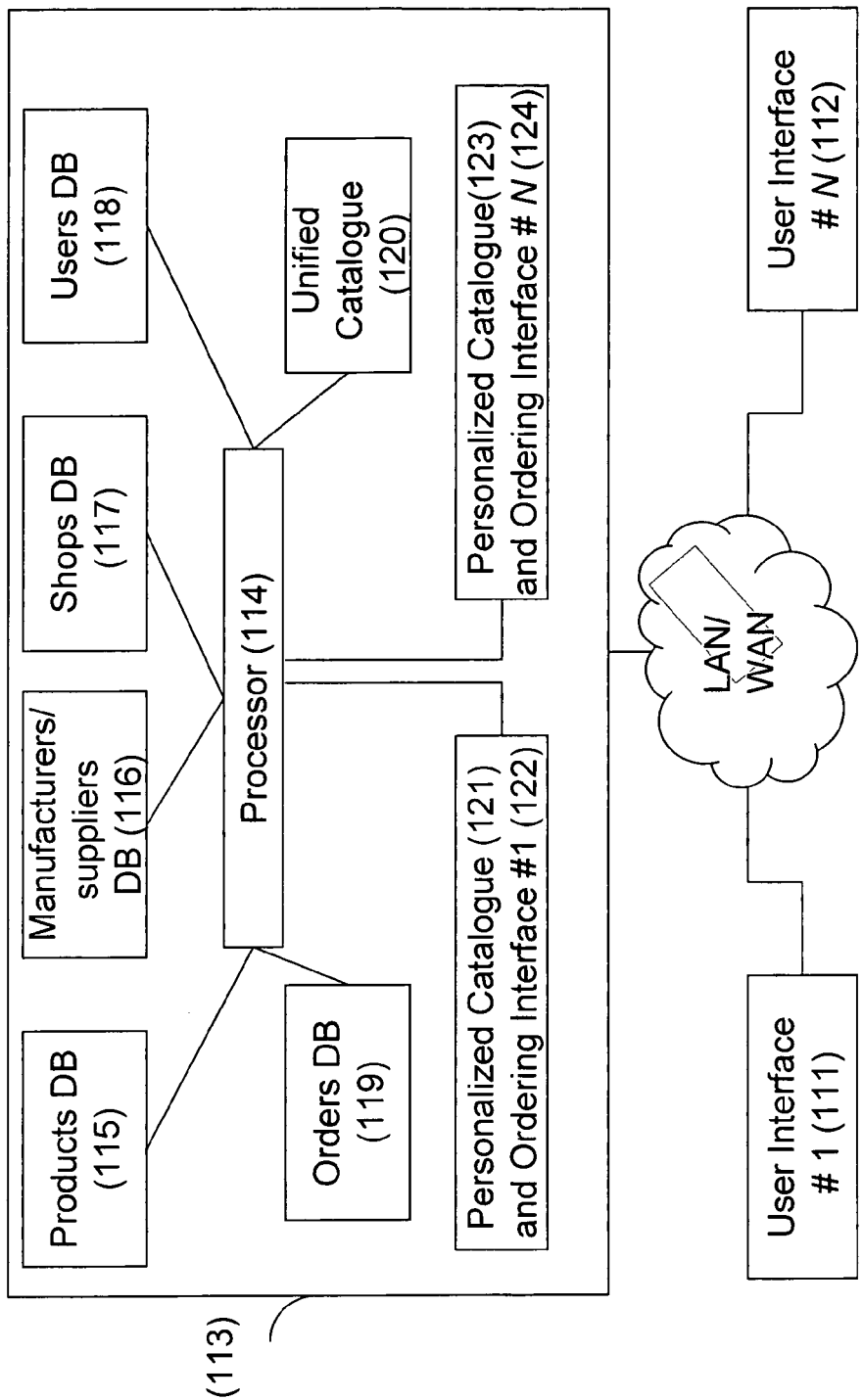
FIG. 1 illustrates a generalized diagram of a system for computerized ordering in accordance with certain embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The references cited in the background teach many principles of computerized ordering that are applicable to the present invention. Therefore the full contents of these publications are incorporated by reference herein where appropriate for appropriate teachings of additional or alternative details, features and/or technical background.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "computerized trolley" or "trolley" used in this patent specification includes any kind of computerized interface allowing a user to provide at least one of the following: select (specify) products the user intends to purchase, review the selected products, make necessary modifications or additions, and order the products in accordance with a selection. The products may be manually selected by the user (e.g. by browsing along the product images and pointing to products, looking for a product by spelling its name or other information about it, using a textual list of products, by voice activated selection, etc.), automatically selected by a computer in accordance with predefined rule(s) (e.g. in accordance with the previous order), etc.

The term "computerized shopping list" or "shopping list" used in this patent specification should be expansively construed to cover any kind of set of products identified as intended for ordering.

Referring to FIG. 1, there is schematically illustrated a system for computerized ordering in accordance with certain embodiments of the present invention. One or more user interfaces (111, 112) are connected to a computer (113). The user interface may be associated with any communication device having input and display capabilities (e.g. personal computer, workstation, PDA, telephone, WebTV device, etc.) and capable to communicate with the computer (113) directly or via telecommunication network (e.g. Wireline or Wireless Public Telephone Networks, Internet, Intranet, cable network, etc.). In certain embodiments of the present invention the user interface may comprise a web-browser. In certain embodiments of the invention the user's interface may be directly associated with the computer (113).

The computer (113) may be a single and/or stand-alone computer or its functionality may be distributed among several different computers running several applications. In certain embodiments of the present invention the computer (113) may be a server-based host.

The computer (113) contains a processor (114) linked with several databases, for example, a products database (115), a manufacturers/suppliers database (116), a shops database (117), a users database (118), an orders database (119), etc. The processor provides necessary processing and management of data stored in the databases as well as management of a unified catalogue (120). The processor executes calculations and data management necessary for ordering process and may contain algorithms and programs for order optimization. In certain embodiments of the invention the calculations and/or data management (or part of them) may be executed by external systems.

The product database (115) contains product-related information. Product-related information includes product characteristic (e.g. manufacturers, suppliers, brands, product specifications, attributes (e.g. weight, type of packaging, etc.) and ingredients, expiry period and availability of each product), product images, product prices (term "price" is related hereinafter to any aspect of the prices—including discounts, coupons, "buy one get two", etc), sellers, etc. In accordance with certain embodiments of the present invention the products are considered to be identical if being characterized by identical certain set of characteristics. The products are considered to be different if comprising at least one different characteristic among said certain set of characteristics. Said set may be predefined, selected by user and/or generated by the system in accordance with predefined rules (e.g. per user's preferences). For example, 4×500 gr sugar bags and 2×1 Kg sugar cans may be considered different if said set of characteristics includes weight and/or packaging, and may be considered identical if these characteristics are not included in the set; similarly, 1% fat and 3% fat milk products may be considered different or identical in accordance with definition of said set of characteristics. The products database may also contain, for each or some of the products, a list of alternative products which are its potential substitutions (i.e. alternatives in case of missing items) and/or replacements (i.e. alternatives with other value, e.g. less expensive, higher quality, etc.) and referring to hereinafter also as "alternative products". In certain embodiments of the present invention, data related to each or some of the products may contain the similarity-related values facilitating recognition of alternative products based on similarity calculations. Similarity calculations may be provided in different manners, e.g. based on an expert assessment, calculated as described in US Patent application 2004/19,536 (Ashkenazi et al.), etc. The products database may also contain association of products with one or more groups as will be further explained with reference to the unified catalog (120).

The manufacturers'/suppliers' database (116) contains ordinary details on manufacturers and suppliers. The shops database (including manufacturers and suppliers directly supplying to end-users) (117) contains ordinary details on shops as well as delivery related information (e.g. delivery schedules and prices for different geographical regions, etc.).

Each of the above databases may also contain statistical information related to products, manufacturers, suppliers and/or shops (e.g. statistical ranking per usage, users' preferences, etc.). For example, the statistical information may include the ordered quantities for each product, distribution of ordered products and entire orders per shops, suppliers, manufacturers, how many users put the products/shops/suppliers/manufacturers on the black list (i.e. "never suggest this to me") or white list (i.e. "this is always the preferred alternative"), geographic or demographic-related distribution of orders, etc.

The users' database (118) contains personal information about users (e.g. name, address, account and paying details, etc.). The database may also contain information about personal preferences (e.g. preferred and/or restricted ingredients, manufacturers, brands, suppliers, shops, packaging, delivery time, etc.) as well as historical and statistical information (e.g. previous orders, favorite items, amount of money spent in each shopping session, etc).

In accordance with certain embodiments of the invention the computerized unified catalogue (120) comprises integrated product-related information (or part of it) from the above databases. The products (and related information) in the catalogue may be arranged in groups, e.g. categories, sub-categories (or several levels of sub-categories) and products. Products are typically characterized by specific ingredients, weight, packing, manufacturer, supplier, shop, brand, price, expiry period, etc. The categories and subcategories may be organized in hierarchical, matrix, relative or other manner, while several categories/subcategories may contain the same product. The grouping of products may be provided by different criteria. In certain embodiments of the invention the product group may contain products with identical characteristics besides, for example, packing, weight, volume, etc. In certain embodiments of the invention the catalogue is organized in department-level categories (e.g. "Fruit and Vegetables", "Meat and Fish", "Household and Cleaning") and shelf-level subcategories (e.g. "Fresh Vegetables", "Fresh Fruits", "Organic Fruits", "For Salad", etc) comprising products families. Each products family is associated with one or more shelves, and each shelf is associated with one or more department(s). A products family is a collection of items which are associated with the same generic product (e.g. coffee/yogurt/dishwasher soap/etc). The products within a products family are sometimes, but not always, replaceable. For example, Decaffeinated Coffee A may be replaceable with Decaffeinated Coffee B, but is probably not replaceable with Caffeinated Coffee C although all three belong to the "Coffee" Products Family.

The unified catalogue may also contain, for each or some of the products, a list of alternative items. In certain embodiments of the present invention, data related to each or some of the products may contain the similarity-related values facilitating recognition of alternative items based on similarity calculations.

In certain embodiments of the present invention the computer (113) is configured to generate and present to a user (e.g. via user's interface) a personal catalogue (121, 123) based on data from the databases and/or the unified catalog, user's preferences (e.g. preferred and/or restricted categories/sub-categories and products; ingredients, manufacturers, brands, suppliers, shops, packaging, delivery time, etc.) and, optionally, a history of the user's ordering. The personal catalogue may be generated for a period of the user's login to the system and/or may be stored and maintained in the computer (113) and/or in a device associated with the user's interface.

Products and their grouping in the personal catalogue may be different from the unified catalog (e.g. depending on user's preferences, etc.). Typically, the personal catalogue does not contain products/manufacturers/shops/etc. included by the user in the personalized black list and/or products which are not delivered to the geographic region of the user. The personal catalogue not necessarily contains all product-related data comprised in the unified catalogue. In certain embodiments of the invention the product-related data in the personal catalogue does not contain information about shops, product availability, and may contain, for example, price range instead of detailed prices in different shops. In some cases (e.g. if a user wants to see all the products available), the personal catalogue may contain the same list of products as the unified catalogue, but, for example, with limited presentation of some product-related information and/or with different grouping.

The personal catalogue may also comprise personalized replacement-related information and preferences. In certain embodiments of the invention the personalized replacement/substitution alternatives may be a subset of overall replacement/substitution alternatives contained in the unified catalogue, and in other cases may comprise replacement alternatives which are absent in the unified catalogue. For example, the unified catalog may contain three standard substitutions A, B and C for a specific product. One user may instruct the system to remove A from his personal list, while another user may specify the system to remove B and add D to his list. These changes may be done by each user either directly (i.e. explicitly mentioning a specific item) or/and by changing the similarity-related values of at least part of the products.

In other embodiments of the invention the computer (113) may be configured to generate and present to a user the unified catalog.

The databases and the catalogues may be updated in different modes, for example, based on data received from different sources (e.g. suppliers, manufactures, shops, agencies, Internet sites, etc.) in a push mode, per request of the computer (113) (or database manager), etc. The input of data in the catalogue may be manually, combined (e.g. computerized input of basic product data and manual input of association with categories and sub categories (e.g. Departments, Shelves, Product Families, etc.) or fully automated.

The computer (113) is also capable to generate and present to each user (e.g. via user's interface) an ordering interface (trolley) (122, 124) further described with reference to FIG. 2.

In certain embodiments of the invention the computer is also capable to communicate with one or more $3^{rd}$ parties database(s) (for example, free coupons database, promotional offering database, etc.).

In certain embodiments of the invention the unified catalogue, the personal catalogue and/or ordering interface may be generated and/or presented by a device associated with the user's interface.

Those skilled in the art will readily appreciate that the invention is not bound by the configuration of FIG. 1; equivalent functionality may be consolidated or divided in another manner. In different embodiments of the invention, connection between the blocks and within the blocks may be implemented directly or remotely. The connection may be provided via Wire-line, Wireless, cable, Voice over IP, Internet, Intranet, or other networks, using any communication standard, system and/or protocol and variants or evolution thereof.

The described functions may be also provided while the blocks being implemented (or integrated with) different equipment. Those skilled in the art will also readily appreciate that the unified organization of product-related information (unified catalogue) and its personalized presentation (personal catalogue) described in this patent specification may be implemented by different data management tools known in the art with no need to maintain the unified catalogue and/or personal catalogue as dedicated data bases.

Figure 2:
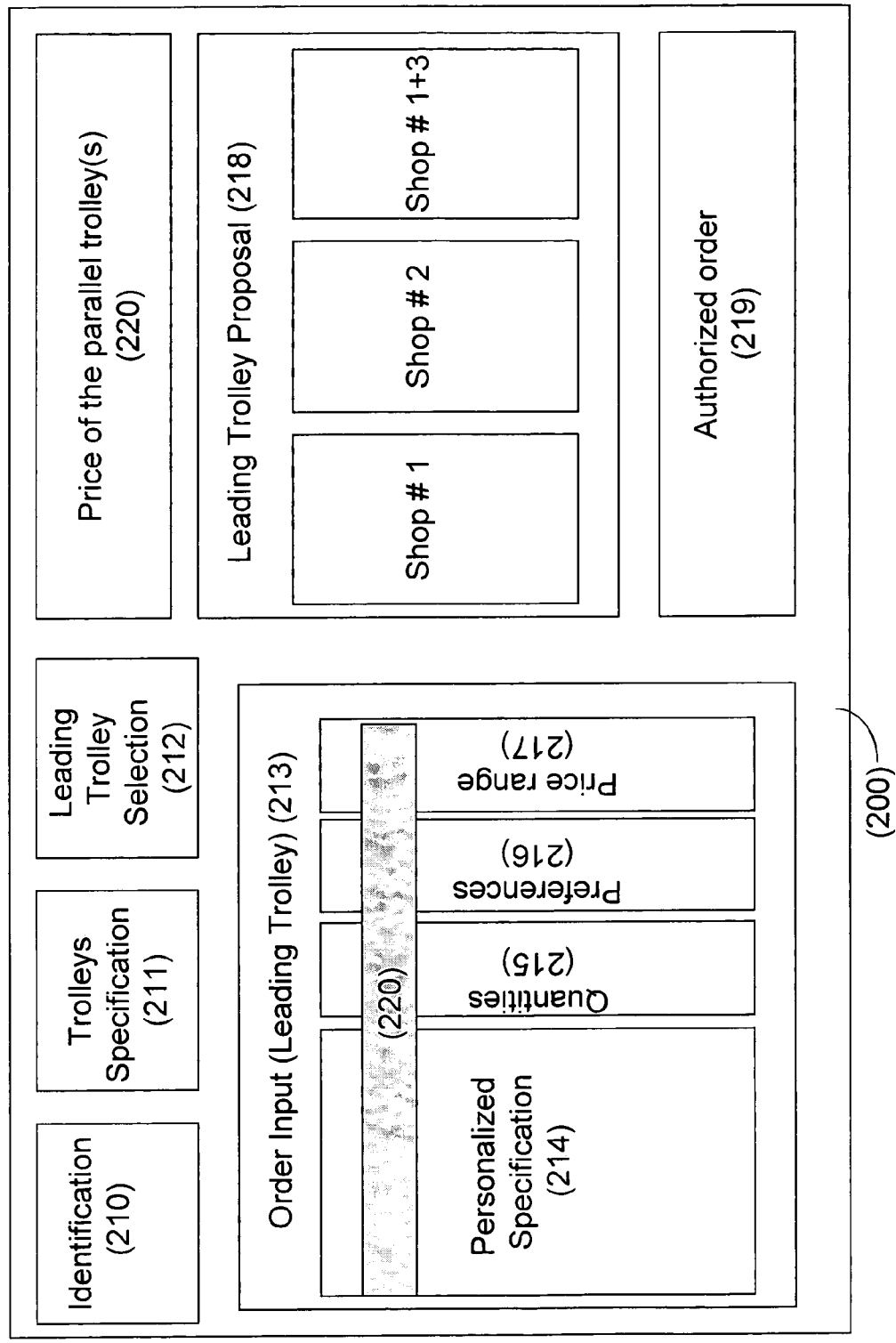
FIG. 2 illustrates a generalized structure of an exemplified ordering interface in accordance with certain embodiments of the invention.

Referring to FIG. 2 there is schematically illustrated an exemplified ordering interface in accordance with certain embodiments of the present invention.

The ordering interface (200) is constructed and arranged to enable a user to selectively aggregate an order based on selection of products and/or groups of products. In preferred embodiments of the invention the ordering is provided based on the personalized catalogue; however the ordering process (or parts thereof) specified in the present invention may be implemented also based on the unified catalogue or/and the databases comprising product-related information.

The ordering interface illustrated by way of non-limiting example in FIG. 2 comprises the following parts: an identification part (210), a trolleys specification part (211), a leading trolley selection part (212), an order input part (213), a proposal part (218) and an order authorization part (219). The parts may be presented in any combination and sequence, for example, simultaneously (including representation in different windows), sequentially (including representation in different screens), per user request, etc.

The identification part (210) contains information necessary for identification the user and/or the order (e.g. user's ID, user's address, order serial number and date, etc.) and may be created automatically by the system resulting opening a new order by the user. Note that, in addition to the standard need of delivery, the user's address may be a criterion for various personalization and optimization processes.

In accordance with certain embodiments of the present invention, the system is configured to support simultaneously at least two trolleys. One trolley, referred to hereinafter as a "leading trolley", is an active trolley with which a user is currently working or directing input. One or more other trolleys (referred to hereinafter as a "parallel trolley(s)") are configured as alternative trolley(s) with functions further detailed with reference to FIG. 5.

In accordance with certain embodiments of the present invention, the ordering interface (200) may comprise products intended to be purchased from one or more shops. The trolleys specification part (211) enables selection of the shop(s) for each of the trolleys in accordance with different criteria, for example, per specific shop or group of shops having mutual characteristics as, e.g. attractive prices, supply chain, shopping place, quality of goods (e.g. organic, kosher, etc.), etc. In certain embodiments of the invention the user may specify only the shop(s) for the leading trolley while the shop(s) for other trolley(s) will be specified by the system in accordance with predefined rule(s) (e.g. the same supply chain, the closest competing chain, the same quality of good, etc.). The trolley specification, at least, defines the products being offered for ordering. For example, when the user specifies the trolley as "Tesco", he/she can order among products presented by Tesco. For a trolley specified as "Tesco and Asda", the user can select among products either by Tesco or by Asda. The trolley specification may comprise also user's preferences. For example, a trolley specified as "Tesco and Asda/Diabetics" contains a subset of "Tesco and Asda" trolley, containing only products fit for diabetics. The trolley specification by user is optional, and some of the trolleys or all trolleys may be specified by the system in advance or/and during ordering process in accordance with certain rule(s) (e.g. in accordance with user preferences, ordering history, etc.).

In certain embodiments of the invention the trolley specification may include also trolleys grouping. For example, the user may group a trolley specified as "Tesco" and a trolley specified as "Asda" and the resulting group of trolleys will have the same configuration and features as a trolley specified "Tesco and Asda".

The leading trolley selection part (212) facilitates selection/re-selection of the leading trolley. The part of order input for the leading trolley (213) facilitates selection of products and/or product groups and contains a specification (214) of products being offered for ordering in accordance with a trolley's specification (in the illustrated example the leading trolley is specified as associated with a shop #1, a shop #2 and a shop #3). Based on the specification, the user (or user and system) selects products intended for ordering among the products offering by said associated shops, thus compiling a computerized shopping list.

In accordance with certain embodiments of the present invention the presentation of the specification may be personalized, e.g. based on the personal catalogue. Optionally, in order to simplify the process of repetitive ordering, the personalized specification may contain separately presented frequent orders and/or last orders and/or favorite products of the user. These frequent/last/favorite orders/products may be stored in the orders database and/or the users database as well as a part of the personal catalogue. Optionally, the system may be configured to facilitate different arrangements of the specification and/or shopping list and/or related thereof. For example, ad-hoc sorting of the specification, e.g., to enable the user to order the products within the shelves or within the product families (for example, User A wants to arrange the products family "ice creams" according to manufacturers (e.g. Haagen Dazs/Ben and Jerry's/etc) while user B will want them sorted according to tastes (chocolate/vanilla/etc).

In accordance with certain embodiments of the present invention, the order input part may be configured to facilitate a multi-level specification of selected product with different levels of specification and abstraction (e.g. group and product levels) for compiling the shopping list. In some cases the user may specify exactly (e.g. product level) the highly targeted products, while in other cases he/she may provide a vague (group level) specification. For example, the user may specify the "Haagen-Dazs strawberry ice-cream" (product level) or may simply specify "strawberry ice-cream". The level of specification is one of the factors defining possible suggestions for alternative products as will be further detailed with reference to FIGS. 5 and 9. The user may also "roam" (i.e. navigate) within the virtual "departments" (categories) and "shelves" (sub-categories) and products families and search for the required group/product.

The specification of the product on the group level enables the system to offer several alternatives for the user's selection or to select the best alternative among the products related to the group, while the specification on the product level enforces the system to include this specific item in the shopping list (or to look for substitutions in case this item is missing). The capability to specify the product on the group level may also simplify the user's navigation by reducing the levels of drill down and/or the number of keystrokes required to point to a product.

It is to be understood that the grouping of products may be provided in different ways, e.g. in accordance with product grouping in a specified shop(s), on the basis of user's preferences, ordering history, unified catalogue, personal catalogue, etc. and each group may include products from one or more shops in accordance with trolley specification.

The system may be also configured to enable manual navigation from the product to the respective group (e.g. product family, shelf, department, etc.). For example, if the user is unsatisfied with proactively proposed alternative products, he/she may navigate from the product to the respective group for manual search of alternatives.

For each of selected products the user may enter required quantities (215). Also he/she may enter preferences/restrictions (216). These preferences/restrictions may be related to a specific product in the order (e.g. essential/desired; replaceable/non-replaceable, etc.) as well as to the entire order as, for example, maximal spending per shopping session, maximal share of different categories/items (e.g. per cost, weight, expiry date, etc.), desired price range, delivery time, number of suborders, maximal monthly spending, allowable and not allowable (wholly or partially) suppliers/shops/manufacturers, etc.

The order input part also contains price and/or a personalized price range (217) corresponding to the selected product. The price range may be generated and presented on the basis of available unified catalogue prices (including alternatives) for the product or the product group (in accordance with the specification) and/or personalized (e.g. filtered) in accordance with the current user's preferences. For example, if the user has specified "Haagen-Dazs strawberry ice-cream", the price range corresponds to price(s) of this ice-cream in the shop(s) specified for the trolley, while if the user has specified "strawberry ice-cream", the price range corresponds to all strawberry ice-creams in said shop(s).

In other embodiments of the invention the order input part may contain separate price presentation of each product (including alternative products).

A part of the computerized shopping list corresponding to a selected product is referred to hereinafter as a "computerized order line" or "order line". The order line comprises the product specification, information related to ordering quantity and corresponding price or price range. The order line may also comprise information related to user's preferences and product-related (e.g. "product of the day", etc.) or order related (e.g. replacement alerting, etc.) provided by the system.

According to certain embodiments of the present invention, the ordering interface may have additional functionality as, for example, generating a price comparison chart of products within a product family, real time calculation and graphic and/or textual presentation of the gap between the current shopping and average weekly/monthly spending and/or predefined sum of money intended for this shopping session; spending in each of the various departments in the supermarket; weight of each item in the order and the total weight, etc. Also the user may be provided with other useful information helping to make right decisions (e.g. how many users put a specific item on their white/black lists, what is the distribution and quantities of buying specific items, etc).

The leading trolley proposal part (218) and the order authorization part (219) will be further detailed with reference to FIGS. 8 and 9. The indication of prices of parallel trolleys (220) may be provided as a part of the leading trolley interface or as a separate interface, and will be further detailed with reference to FIG. 5.

Those skilled in the art will readily appreciate that the invention is not bound by the configuration of FIG. 2; equivalent and/or modified functionality may be consolidated or divided in another manner.

Figure 3:
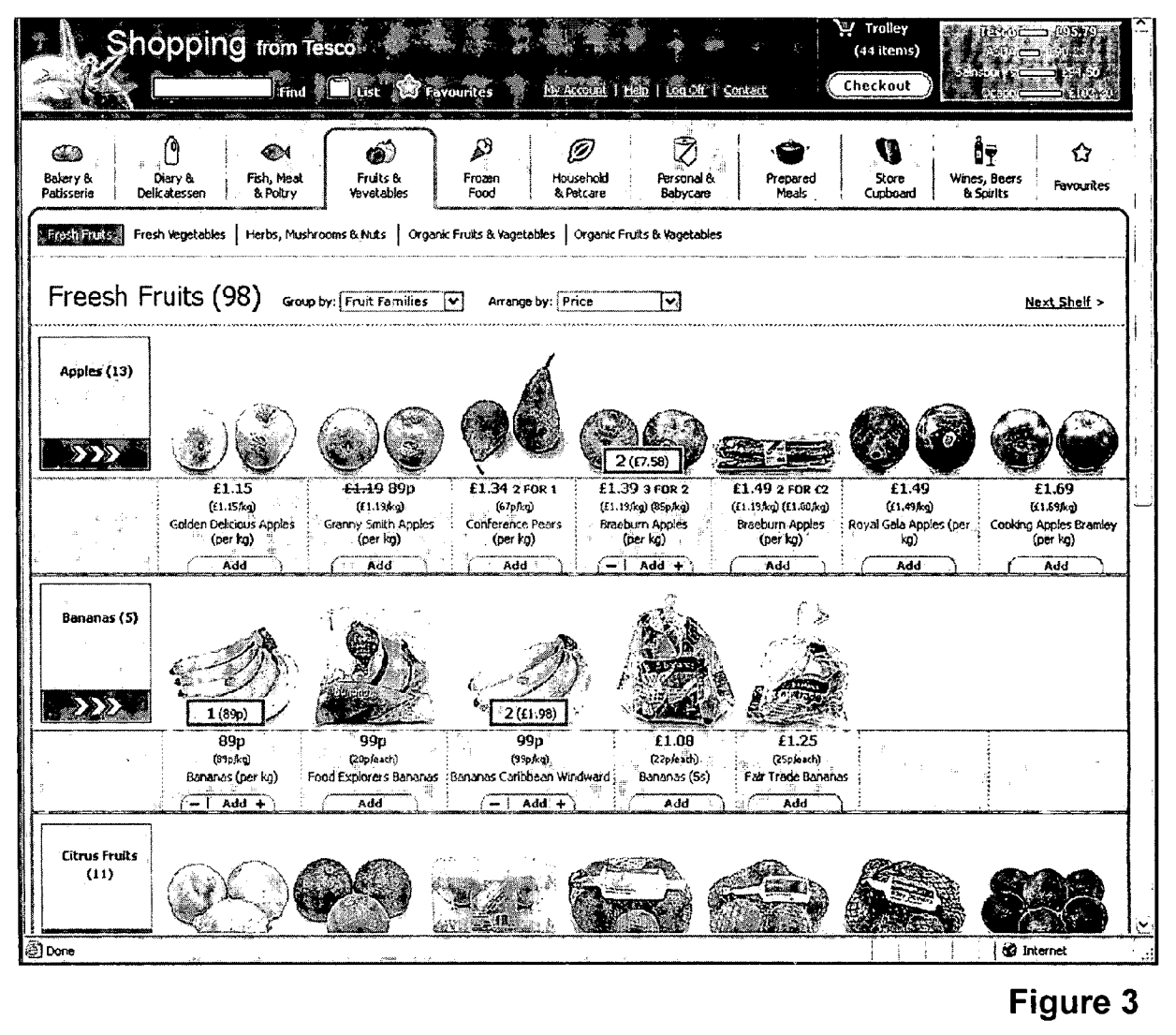

FIG. 3 illustrates by way of non-limiting example a fragment of a sample screen comprising order input part specification in accordance with certain embodiments of the present invention.

Figure 4:
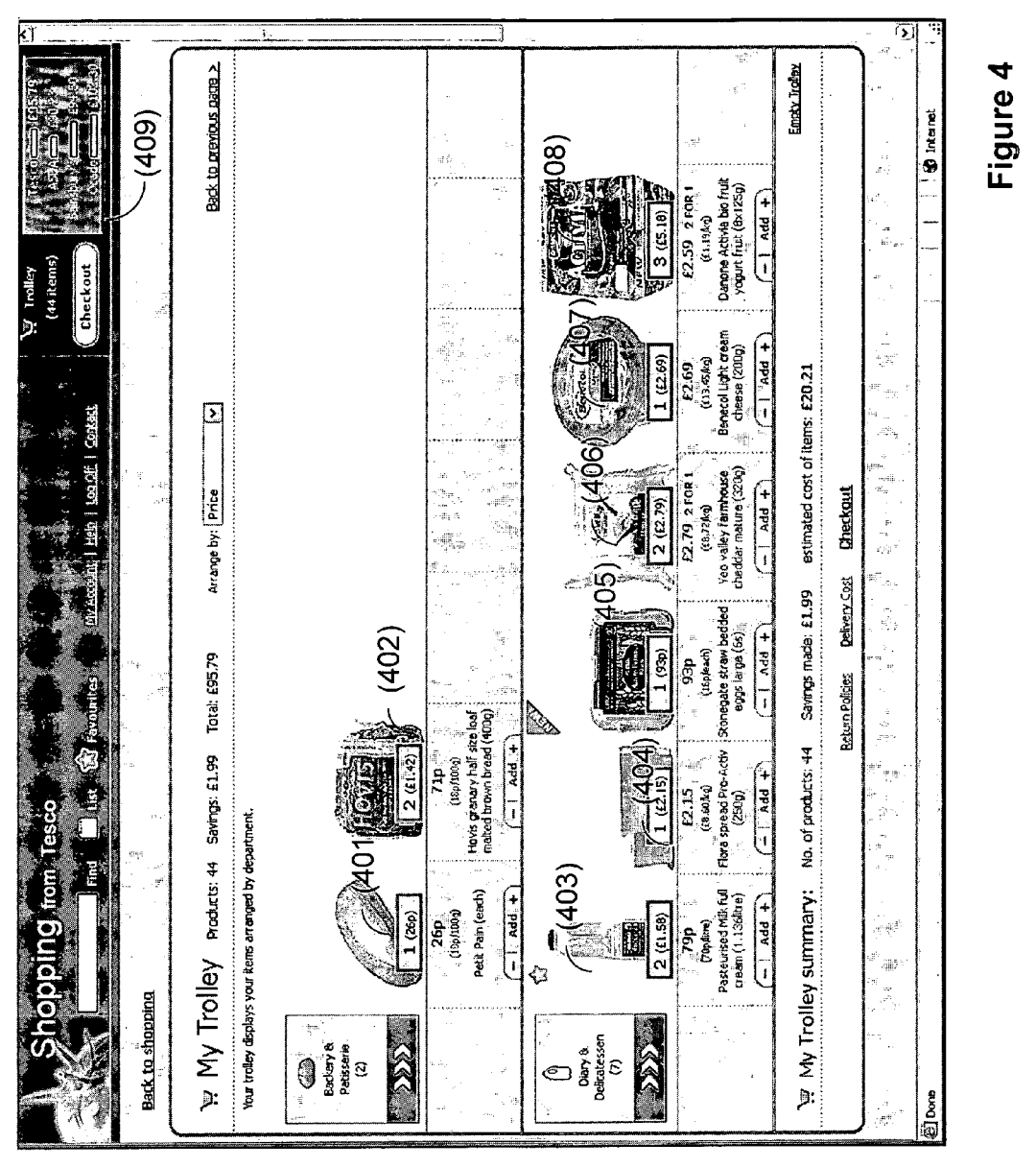

FIG. 4 illustrates by way of non-limiting example a fragment of a sample screen comprising the computerized shopping list in the leading trolley (specified as "Tesco" in the illustrated example) in accordance with certain embodiments of the present invention. The order lines (401-408 respectively) comprise the product specification, information related to ordering quantity and corresponding price or price range. As was detailed with reference to FIG. 2, in accordance with certain embodiments of the present invention the product may be specified on a group level. Such specification may give rise to several order lines corresponding to the product and comprising different alternative products for user's selection of preferable order line. Alternatively, group-level specified product may give rise to a single corresponding order line comprising the alternative selected by the system in accordance with predefined rules and/or user's preferences. The information related to the ordering quantity may be specified as a number of ordering items and/or required weight/volume. The exemplified fragment also contains representation of the parallel trolleys (409) and their corresponding total prices. In accordance with certain embodiments of the present invention each of the parallel trolleys may be selected as a leading trolley by clicking on the respective trolley at any moment before approving the final shopping list.

Figure 5:
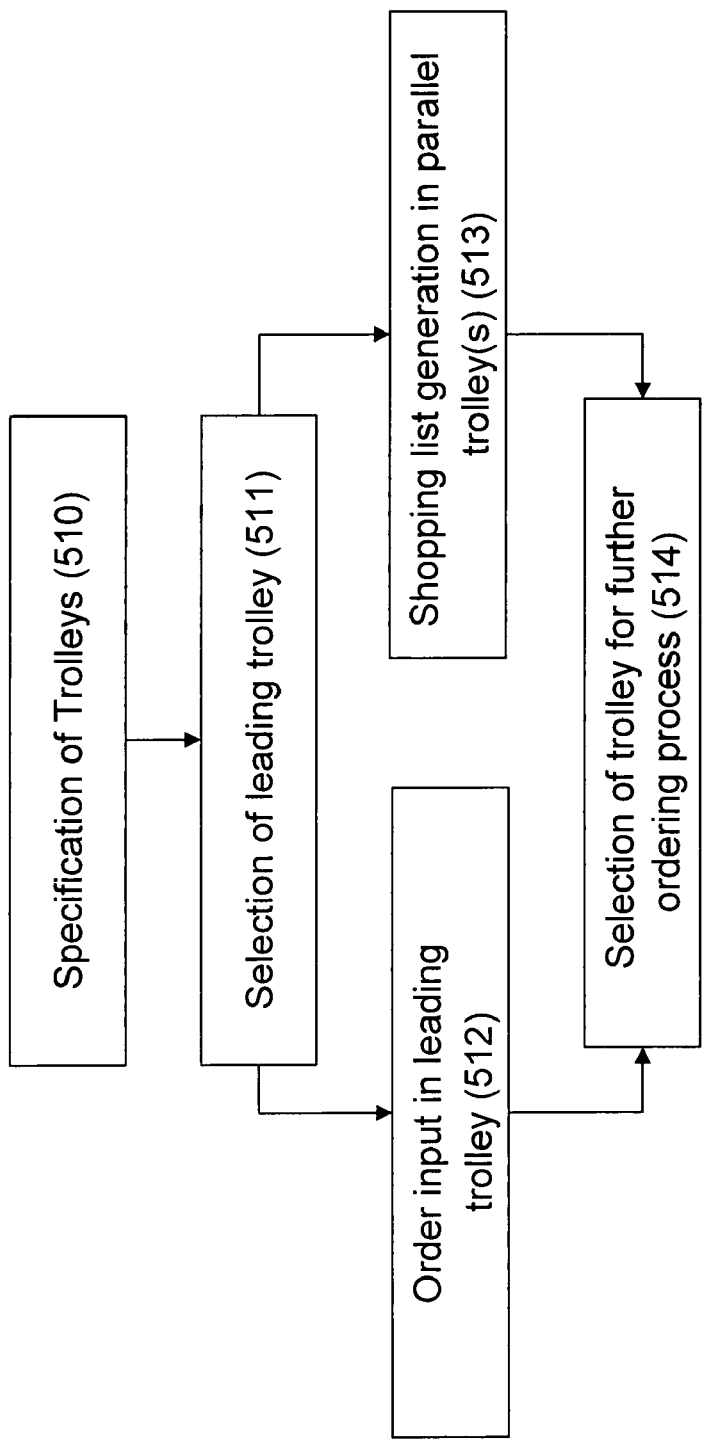
FIG. 5 illustrates a generalized flow diagram showing the principal steps of order specification process in accordance with certain embodiments of the invention.

FIG. 5 illustrates a generalized flow diagram showing the principal steps of an order specifying process in accordance with certain embodiments of the invention.

As was mentioned with reference to FIG. 2, in accordance with certain embodiments of the present invention, the system is configured to provide and support at least two trolleys, a leading trolley and at least one parallel trolley. The system is configured to support switching back and forth between the trolleys, while at any moment only one (leading) trolley is available for user for an active order input and the order line(s) in the other(s) trolley(s) are automatically generated by the system in accordance with predefined rule(s). Said generation may be provided simultaneously with order line(s) generation in the leading trolley, with a predefined delay, per user request, per specific predefined event, etc. The order specification starts with specification of trolleys (510). As was detailed with reference to FIG. 2, one or more shops may be assigned to each trolley. The personalized presentation of products for ordering may be selected and provided in accordance with grouping fitting one of the specified shops or in accordance with grouping in the unified catalogue or personal catalogue provided in correspondence with user's preferences. The trolleys may be specified by the user or/and by the system in accordance with predefined rule(s).

Upon trolleys' specification (which may be done on-line, off-line, in previous on-line session(s), by default, etc.) the user or system selects the leading trolley between the specified trolleys. In certain embodiments of the invention, by selecting the leading trolley the user specifies a shopping environment, e.g. products and their grouping to be displayed when navigating the system. The shopping environment (grouping) may be provided in accordance with unified or personal catalogues, while selecting the leading trolley specifies the products being offered which are presented as if belonging to a single shop. Other embodiments of the invention are also possible, for example, if there are several shops specified for the leading trolley, the user may select/re-select environment of one of the shops as shopping environment of the leading trolley, personalized catalogue may be configured in accordance with shopping environment of this shop, etc. Thus, the user may be provided with the shopping environment, with which she/he is familiar from physical shopping (e.g. for Tesco trolley the user can get an interface representing department/shelf grouping/products with which he is familiar when shopping at Tesco) and/or from previous experience of computerized ordering per the unified and/or personal catalogue.

The leading trolley selection (511) may be provided by the user or by the system in accordance with a predefined rule(s) (e.g. per leading trolley selection during previous ordering session, cheapest trolley during previous ordering session, etc). The system is configured to facilitate selection/re-selection of leading trolley per user's request. The system may be configured to provide the user with additional information useful for leading trolley selection, e.g. leading trolleys and their parameters in previous shopping sessions, the number (or percentage) of users that selected each of the shops for their leading trolley, delivery slots available for the specified trolleys, etc.

In accordance with certain embodiments of the present invention, the system is configured to keep user preferences (e.g. white and black lists) simultaneously for all specified trolleys. Moreover, the system is configured to keep user's ordering history (e.g. last trolley, favorites, etc.) while selecting a parallel trolley as a leading trolley.

Upon selection (on-line, off-line, in previous on-line session, by default, etc.) of the leading trolley, the user may start compiling the computerized shopping list (512). In accordance with certain embodiments of the present invention, the system is configured to generate order line(s) in the parallel trolley(s) matching to the order line in the leading trolley (513) and comprising products being offered by the shops specified for the parallel trolley(s). This generation may be provided concurrently with compiling the shopping list in the leading trolley, with a pre-defined delay, per predefined event (e.g. upon completion of shopping list in the leading trolley, per user request, etc.), etc. Typically, the matching order line in the parallel trolley comprises the product identical to the product selected in the leading trolley. If in the shops specified for a parallel trolley there are no products identical to one or more products selected in the leading trolley, the system substitutes these products by substituting alternatives available in said shops. In the same manner the system provides substituting alternatives for user preferences and/or ordering history when switching from the leading trolley to a parallel trolley. As was detailed with reference to FIG. 1, in accordance with certain embodiments of the present invention the products are considered to be identical if being characterized by identical certain set of characteristics. Said set may be predefined, selected by user or generated by the system in accordance with predefined rules.

Figure 6:
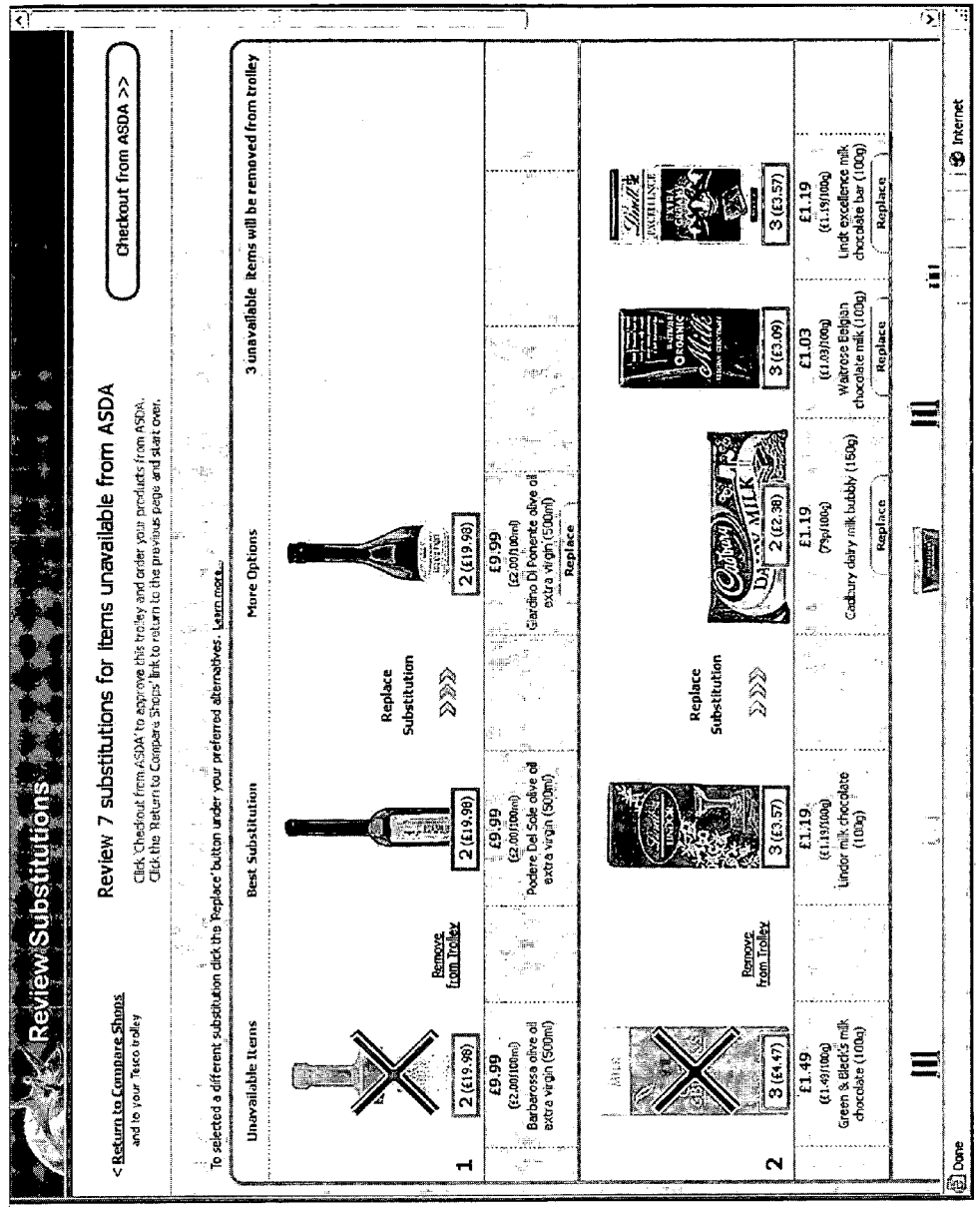
FIG. 6 illustrates a fragment of a sample screen for substitution selection in accordance with certain embodiments of the present invention.

In certain embodiments of the invention if a product in the leading trolley is substituted by several products in the parallel trolley, the system facilitates the user to select one of the substitution alternatives as illustrated by way of non-limiting example in a fragment of sampled screen in FIG. 6. In other embodiments of the invention the selection of a substituting alternative may be provided by the system in accordance with predefined rule(s).

In certain embodiments of the invention the system is configured to calculate and present the price of a currently compiled shopping list in the leading trolley and corresponding price(s) in the parallel trolley(s). Calculation of corresponding price(s) in the parallel trolley(s) may be provided concurrently with calculations of total price of the shopping list in the leading trolley. The system may be also configured to calculate and present the price difference between trolleys. The system may also be configured to calculate and present the price (or price range) of a group of trolleys. The grouping may be provided in accordance with various criteria (e.g. shops within one shopping center, shops with pickup option, shops with off-line shopping option, etc.).

If no substituting alternative is available in a parallel trolley, the system may calculate the price of the matching shopping list in the parallel trolley as if the specified product is also available for the parallel trolley with the same price as calculated in the leading trolley, thus enabling a fair price comparison between the trolleys. In certain embodiments of the invention for such a case the system may also automatically generate a matching order line(s) in the parallel trolley(s) comprising the selected product at the same price or price range as in the leading trolley. Said selected product(s) in the parallel trolley(s) may have a special marking indicating that it is not available in the parallel trolley(s).

In certain embodiments of the invention the system is configured to disable a parallel trolley if there is no substitution alternative to a product marked as "must have".

In certain embodiments of the present invention the system may alert the user about better (e.g. less-expensive) alternatives in a parallel trolley or about a possible saving. Certain aspects of the present invention facilitate computerized ordering in alternative shop(s) (parallel trolley) using a shopping environment that the user is familiar with (leading trolley).

Thus, when the user completes selection of products and/or product groups, he/she is facilitated to see the final shopping list in the leading trolley and matching shopping list(s) in the parallel trolley(s) and to select (514) the preferred trolley for further ordering process. In certain embodiments of the invention the selection of preferred trolley for further ordering process may be provided by the system in accordance with predefined rule(s) (e.g. cheapest trolley, trolley best fitting the user's preferences, etc).

FIG. 7 illustrates by way of non-limiting example a fragment of a sample screen for selecting the preferred trolley for further ordering process.

Figure 8:
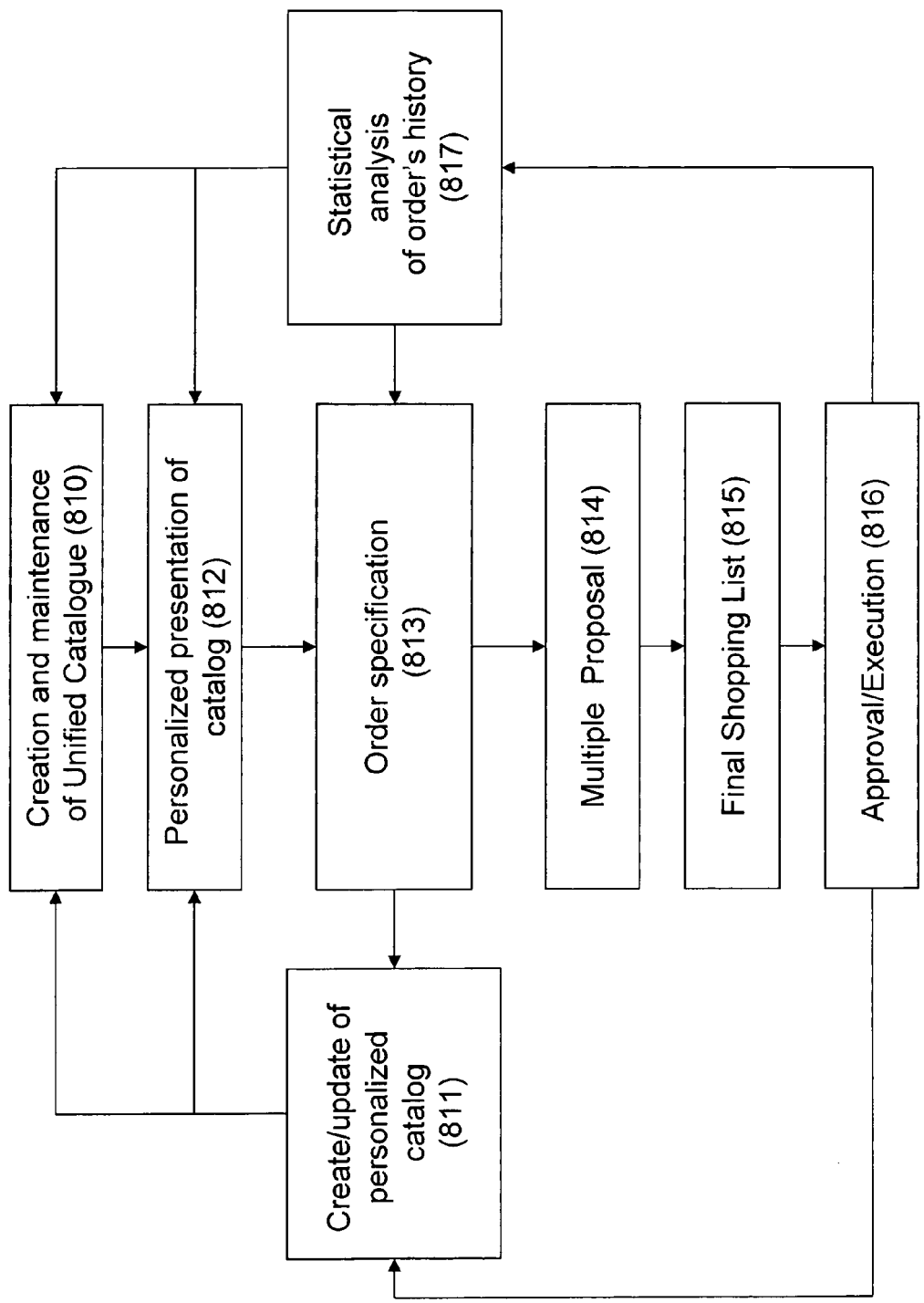
FIG. 8 illustrates a generalized flow diagram showing the principal steps of operating the ordering process in accordance with certain embodiments of the invention.

FIG. 8 illustrates a generalized flow diagram showing the principal steps of operating the ordering process in accordance with certain embodiments of the invention.

The ordering process starts (810) with creation of unified catalogue organizing the items being offered by different manufacturers, suppliers and shops in unified groups (e.g. Departments, Shelves and Products Families). In certain embodiments of the invention the unified catalogue may also comprise substitutions and/or replacements of products and/or values for calculation thereof. The ongoing maintenance of the unified catalogue is based on data about new products/manufactures/suppliers/shops received from external sources as well as internal data about user's preferences and ordering statistics.

In certain embodiments of the invention the personalized presentation of products (personal catalogue) is generated (811) during each shopping session in accordance with user preferences received from different sources, e.g.:

Personal catalogue saved from the previous session;
Previous trolleys generated and/or selected by users;
Instructions received from the user during the shopping process;
Previous leading trolley;
Previous users' choices within ordering proposals;
Special questionnaires to be completed by users;
History of actual ordering, etc.

In other embodiments of the present invention, the personal catalogue may be stored and maintained in the computer (113) and/or in a device associated with the user's interface and be updated during the shopping session in accordance with information sources above.

Upon creating/updating, the personal catalogue is presented to the user (812) and enables to start an order specification (813) as was detailed with reference to FIG. 5. In accordance with certain embodiments of the invention the generating and/or presentation of the personal catalogue may be synchronized with the ordering process. For example, if the user is currently roaming within a "cheese" category, the generated and/or presented personal catalogue contains only personalized cheese-related data while the personalized meat-related part may be generated and/or presented when the user is interested in the "meat" category.

In accordance with order specification process described with reference to FIG. 5, the catalogue presentation (e.g. products, grouping, pricing, availability, etc.) is personalized in accordance with specification of a trolley currently selected as "leading trolley".

Figure 9:
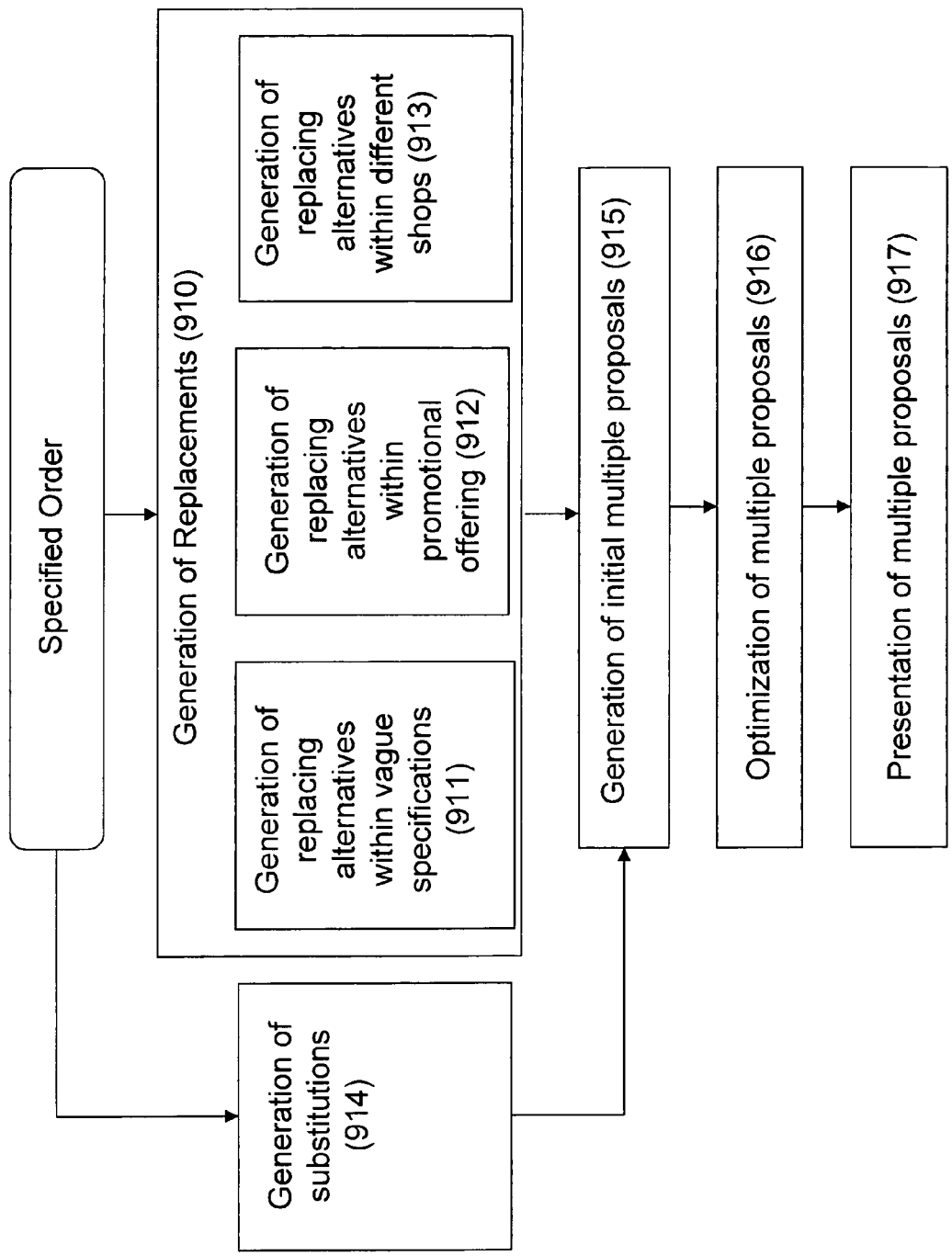
FIG. 9 illustrates a generalized flow diagram showing the principal steps of multiple-proposal generation in accordance with certain embodiments of the invention.
Figure 10:
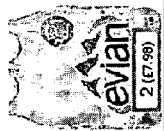
FIG. 10 illustrates a fragment of a sample screen for replacement selecting in accordance with certain embodiments of the present invention.

The completion of order specification (compiling the shopping list and selection of a trolley for further ordering process) starts a multiple-proposal generation illustrated in FIG. 9. The generation of a multiple proposal starts from a process of generating replacement alternatives (910) and/or substitution alternatives (914). The alternative products (replacement and/or substitution) may be generated, for example, within vague, e.g. group-level, specifications (911), promotional offering (912) and/or different shops (913) specified for the selected trolley. In certain embodiments of the present invention if there are several alternative products to be suggested the system may facilitate the user to select one of the alternatives as illustrated by way of non-limiting example for replacing alternatives in a fragment of sampled screen in FIG. 10. In other embodiments of the invention the selection of the alternative product may be provided by the system.

In certain embodiments of the invention the promotional offering may also include special discounts provided in accordance with information received from the shops associated with the trolley or from a 3$^{rd}$ party database (e.g. free coupons, vouchers, etc). The system is configured to check if the shopping list matches specific validation requirements (e.g. total price above X, delivery at specific hour, ordering a specific combination of items, specific terms with respect to previous shopping sessions, etc.) of such promotional offering, and to provide the order's optimization accordingly.

In certain embodiments of the present invention the system is also configured to check if the required volume/weight of the selected product may be provided by similar products in different packaging (e.g. "Sugar, 2 Kg" may be supplied by 4×500 gr sugar bags, by 2×1 Kg sugar cans or by a 1×2 Kg sugar can) and to generate, accordingly, the alternative proposals.

Multiple initial proposals comprising different combinations of the replacement alternatives are generated (915) within limitations of the user's preferences; and the entire order is further optimized (916) in terms of price, user's preferences and/or specific requirements of the market segment. For example, optimization may be provided in accordance with following:

Ranked fulfillment of shopping order, wherein the system is configured to enable the shopper to specify which shopping-list lines are "must have" and which are only "nice to have", in other words—"if these 'nice to have' items are missing I don't care and I am willing to get the partial shipment from X as long as it is significantly cheaper. However, if these "must have" items are missing I am willing to pay more to Y because I must have them".

Controlled splitting of order, wherein the optimization algorithm is configured to support also optimization parameters related to delivery characteristics, e.g. minimal price of order per delivery, delivery expenses, sensitive delivery with special handling (e.g. in refrigerator), products' expiration date, ability/inability to get the delivery at the workplace, the need to coordinate a physical presence when delivery arrives, etc.

The split decision may also lead to replacement or substitution of products. For example, if after a split of an order between two shops (e.g. supermarkets), one gets the lion's share of the order and the other is little below its minimal-order threshold, the system may make a decision of transferring one product from order A to order B. However, if supplier B does not stock the transferred product, the system may replace the product with an alternative product stocked by B.

In certain embodiments of the present invention the generation of multiple proposals may be started by different events, e.g. every time the user adds a product to the leading trolley, when the shopping environment is changed (e.g. change of leading trolley), per user's request, etc.

The system may be configured to generate in the same manner, multiple proposals for the parallel trolleys. In this case, when calculating the total price for the parallel trolleys, the system may present the price range corresponding to respective multiple proposals or a price of the best proposal (e.g. the cheapest proposal and/or proposal with best fit to user's preferences, etc.).

The proposal(s) offered to the user (917) may be presented in the proposal part (218) of the shopping cart, may contain recommended products optimized in terms of the entire order price/quality/convenience/etc., and may comprise several alternatives (e.g. for replacement or splitting) for user's choice. In certain embodiments of the invention said choice may be provided by the system in accordance with predefined rule(s). For example, for the leading trolley illustrated with reference to FIG. 2, the alternatives may include shopping lists for several options, e.g. buying of the entire order in shop #1 or shop #2 or splitting the order between shops #1 and #3.

Referring back to FIG. 8, the above multiple proposals presented to the user (814) may have special marks supporting process (optionally interactive) of user's choice. Each product recommended by the system may have, for example, special marks of premium/standard/basic categories thus enabling the user to easily recognize the money saving options; or indication "of origin", i.e. if the product is specified by the user or recommended by the system as a replacement alternative, etc. In certain embodiments of the present invention the user may click on the product to see (and select if necessary) replacement alternatives.

On the step of final shopping list (815) the user may select among presented multiple proposals or change the shopping list thus starting the generation of new proposal(s) within the leading trolley. For example, assume that the system produced three proposals: From shop A, which contains all the items but is more expensive than that of shop B; from shop B, which is less expensive but lacks one of the 'nice to have' items; and a combined delivery from A and B which is less expensive from both proposal A and proposal B but enforces the user to wait for two hours at home for the multiple deliveries. The user is now required to decide if this price difference is worth two hours of waiting (i.e. decide on the combined proposal of A+B), otherwise to consider if the inconvenience of not having the 'nice-to-have' product is worth the saving in money (thus selecting B) or if the price difference does not justify this problem and therefore selecting A. If the user is unsatisfied with the proposed alternatives, he may refine the shopping list (e.g. to mark the previously "wishful" item as "must" or limit the delivery time by 1 hour, etc.) and to request for a new proposal(s).

The user may also select one of the parallel trolleys as a leading trolley, and to get the proposal optimized in accordance with shop(s) specified for this trolley. In certain embodiments of the invention the optimization of parallel trolley(s) may be provided substantially in parallel with optimization of the leading trolley or may be, for example, triggered by user's selection of the parallel trolley as the leading trolley. Optionally, the optimized order(s) in parallel trolley(s) may be presented to the user in parallel with the optimized order in the leading trolley.

After user's approval (816), the order may be executed in different ways known in the art, saved for further review, used for physical shopping, etc.

The statistical analysis of actual ordering (817) may be used during order specification and/or further personalization of the personal catalogue. Also the actual statistics of user's preferences and decisions (ordering) enables ranking of the products, manufacturers, suppliers and/or shops in the unified catalogue. As a result, clicking on specific category (e.g. group), a shopper may get ranking of items within the group per user's preferences, e.g. "72.4% of the customers preferred X, 0.02% preferred Y", etc. In addition to that, a shopper may get ranking per actual ordering, e.g. "42% of the customers bought washing liquid X, 22% bought Y, and 36% bought Z" as well as ranking of products in the unified catalogue.

In certain embodiments of the invention the system is configured to compare multiple proposals within a leading trolley and/or proposals within different trolleys and present the difference (potential saving). The potential saving may be presented during any one or more steps illustrated in FIGS. 8 and 9 as well as per user request.

Referring to FIG. 11, there is schematically illustrated, by way of non-limiting example, an exemplified delivery optimization in accordance with certain embodiments of the invention. As was previously mentioned with reference to optimization process (916), in accordance with certain embodiments of the present invention, the optimization parameters may be related to delivery characteristics. The delivery problem has especial importance for the SFG market and may become a barrier for on-line shopping as, typically, SFG delivery shall be provided to the user's home and cannot be redirected to another place (e.g. office). This problem becomes more complex for splitting orders because of different delivery schedules and delivery costs provided by different shops. In accordance with certain embodiments of the present invention the system is configured to generate a unified delivery schedule which may be presented to the user. Such a unified schedule contains time slots in which all deliveries may be supplied at (almost) the same time and the total cost for each alternative. In the schedule exemplified in FIG. 11a retailer A (1101) is committed to 30 minutes time slots for everyday deliveries excluding Sunday. Retailer B (1102) is committed to two hours time slots for everyday deliveries. The illustrated schedule tables also include delivery cost of available slots. For example, slots available on Monday are 21:00-21:30 and 21:30-22:00 of retailer A and 19:00-21:00 of retailer B. The combined table of retailers A+B (1103) illustrated in FIG. 11b comprises delivery slots matching to both retailers and combined cost if the order is split. In this manner, the system may optimize proposal in accordance with user's delivery requirements.

It is to be understood that the invention is not limited in its application to the details set forth in the description contained herein or illustrated in the drawings. The invention is capable of other embodiments and of being practiced and carried out in various ways. It should be noted that the invention is not bound by the specific, algorithm of processing or specific structure. Those versed in the art will readily appreciate that the invention is, likewise, applicable to any other processing or presentation with equivalent and/or modified functionality which may be consolidated or divided in another manner.

Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a computerized system for ordering at least one product being a part of a final shopping list, the method comprising:
   providing by the ordering system a first computerized trolley configured to facilitate a user to select at least one product among products being offered by one or more shops associated with the first trolley, thus giving rise to at least one first computerized order line corresponding to the selected product and being a part of a first computerized shopping list;
   automated generating by the ordering system at least one second computerized trolley matching the first computerized trolley and comprising one or more second computerized order lines being a part of a second computerized shopping list, each said second order line comprising a product matching the product in corresponding first order line and being offered by one or more shops predefined as associated with the second trolley, said shops being different from the shops associated with the first trolley, wherein automated generating at least one second order line among generated second order lines comprises automated generation by the ordering system of a product alternative to the product selected by the user among the products being offered by one or more shops associated with the first trolley and comprised in the respective first order line; and facilitating compiling the final shopping list on the basis of said first shopping list or said second shopping list.

2. The method of claim 1, wherein at least one said second order line is generated concurrently with said first order line.

3. The method of claim 1, wherein at least one said second order line is generated in a predefined delay after said first order line.

4. The method of claim 1, wherein at least one said second order line is generated in accordance with a predefined event.

5. The method of claim 4, wherein the predefined event is the user's request for generating said second order line.

6. The method of claim 1 further comprising calculating and displaying total price of the order lines comprised in said first shopping list.

7. The method of claim 1 further comprising calculating and displaying total price of the order lines comprised in at least one said second shopping list.

8. The method of claim 1 further comprising calculating and displaying a price range corresponding to total prices of the order lines comprised in at least two said shopping lists.

9. The method of claim 7, wherein the calculation of the total price of the order lines comprised in at least one second shopping list is provided concurrently with said order lines generation.

10. The method of claim 9, wherein displaying the total price of the order lines comprised in at least one second shopping list is provided concurrently with said order lines generation.

11. The method of claim 1 further comprising calculating and displaying a difference between total prices of the order lines comprised in said shopping lists corresponding to said first trolley and at least one said second trolley.

12. The method of claim 11, wherein calculating said difference is provided concurrently with said second order lines generation.

13. The method of claim 12, wherein displaying said difference is provided concurrently with said second order lines generation.

14. The method of claim 1, wherein said one or more shops associated with at least one trolley are selected by the user.

15. The method of claim 1, wherein said one or more shops associated with at least one trolley are predefined.

16. The method of claim 1, wherein said one or more shops associated with at least one trolley are selected automatically.

17. The method of claim 16, wherein said one or more shops associated with at least one second trolley are selected in accordance with one or more shops associated with the first trolley and in accordance with predefined rules.

18. The method of claim 1 further comprising:
creating a unified catalogue comprising information related to products being offered by one or more shops associated with the first trolley and at least one of said second trolleys, wherein said products are grouped in accordance with certain criteria, and
configuring the first trolley to facilitate the user to select one or more products on the basis of the unified catalogue.

19. The method of claim 18, wherein the unified catalogue comprises information related to replacing or substituting products.

20. The method of claim 19 further comprising:
collecting one or more of user's preferences;
generating, in accordance with the user's preferences, a personal catalogue as a derivation of the unified catalogue;
configuring the first trolley to facilitate the user to select one or more products on the basis of the personal catalogue.

21. The method of claim 20, wherein the personal catalogue comprises information related to personalization of replacing or substituting products.

22. The method of claim 20, wherein the products in the personal catalogue are grouped in accordance with said user's preferences.

23. The method of claim 20, wherein the products in the personal catalogue are grouped in accordance with products' grouping in one of the shops associated with the first trolley.

24. The method of claim 1, wherein the alternative product in said second order line is replacing the respective product in said first order line and characterized by other quality and/or other package and/or other delivery time.

25. The method of claim 24, wherein the second order line is generated in accordance with information related to personalization of substituting products.

26. The method of claim 7, wherein the total price of the second shopping list is calculated using price information related to the product selected in the first order line if said selected product has no available matching product among the products being offered by one or more shops associated with said second trolley.

27. The method of claim 7, wherein in a case that said selected product has no available matching product among the products being offered by one or more shops associated with said second trolley, the generated corresponding second order line comprises the selected product with the same price or price range as in the first order line.

28. The method of claim 27, wherein said selected product comprised in the second order line is provided with special marking indicating its non-availability in the second trolley.

29. The method of claim 1, wherein at least one second trolley is configured to automatically generate at least two second order lines matching to said first order line configured to facilitate the user's selection of one of said second order lines, wherein at least one of said second order lines comprises a product substituting the selected product.

30. The method of claim 1 further comprising automatically optimizing at least one of the shopping lists in accordance with predefined criteria.

31. The method of claim 30, wherein the predefined criteria is related to delivery characteristics.

32. The method of claim 30, wherein the optimization includes splitting a shopping list between at least two shops associated with the corresponding trolley.

33. The method of claim 30, wherein the predefined criteria is one or more validation requirements associated with promotional offering received from the shops associated with the trolley or from a 3rd party database.

34. A system for computerized ordering at least one product being part of a final shopping list, the system comprising:
means for generating a first computerized trolley configured to facilitate a user to select at least one product among products being offered by one or more shops associated with the first trolley, thus giving rise to at least one first computerized order line corresponding to the selected product and being a part of a first shopping list;
means for generating at least one second computerized trolley matching the first computerized trolley and comprising one or more second computerized order lines being a part of a second computerized shopping list, each said second order line comprising a product matching the product in corresponding first order line and being offered by one or more shops predefined as associated with the second trolley, said shops being different from the shops associated with the first trolley said second order line being a part of a second shopping list;

means for selecting a product alternative to at least one product in at least one second order line among generated second order lines, said product to be selected among the products being offered by the shops associated with the second trolley, said product replacing the respective product in said first order line and characterized by other quality and/or other package and/or other delivery time;

means for generating a final shopping list configured to be based on said first shopping list or on said second shopping list.

35. A method of operating a system for computerized ordering at least one product being a part of a final shopping list, the method comprising:

providing by the ordering system a first computerized trolley configured to facilitate a user to select at least one product among products being offered by one or more shops associated with the first trolley, thus giving rise to at least one first computerized shopping list;

automated generating by the ordering system at least one second computerized trolley matching the first computerized trolley and comprising at least one second computerized shopping list comprising one or more products being offered by one or more shops predefined as associated with the second trolley, said shops being different from the shops associated with the first trolley, wherein the products in the second computerized shopping list are generated by the ordering system as matching to respective selected products in said first computerized shopping list, and wherein generating the second shopping list comprises automated generation by the ordering system of at least one product alternative to the respective matching product selected among the products being offered by the shops associated with the first trolley and comprised in the first computerized shopping list; and facilitating compiling the final shopping list on the basis of said first shopping list or said second shopping list.

36. The method of claim 35, wherein the alternative product comprised in said at least one second shopping list is replacing the respective product in said first order line and characterized by other quality and/or other package and/or other delivery time.

37. A computer program comprising computer program code means for performing all the steps of claim 1 when said program is run on a computer.

38. A computer program as claimed in claim 37 embodied on a computer readable medium.

39. The method of claim 18, wherein the automated generation of the second trolley comprises searching by the ordering system the products within unified catalogue matching the products comprised in the first trolley and offered by at least one shop which is not associated with the first trolley.

* * * * *